US009750048B2

(12) United States Patent
Damnjanovic et al.

(10) Patent No.: US 9,750,048 B2
(45) Date of Patent: Aug. 29, 2017

(54) FEEDBACK SIGNAL MANAGEMENT FOR LOW LATENCY WIRELESS COMMUNICATIONS

(71) Applicant: QUALCOMM Incorporated, San Diego, CA (US)

(72) Inventors: Aleksandar Damnjanovic, Del Mar, CA (US); Madhavan Srinivasan Vajapeyam, San Diego, CA (US); Wanshi Chen, San Diego, CA (US); Onkar Jayant Dabeer, San Diego, CA (US); Shimman Patel, San Diego, CA (US); Hao Xu, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/864,756

(22) Filed: Sep. 24, 2015

(65) Prior Publication Data

US 2016/0128096 A1     May 5, 2016

Related U.S. Application Data

(60) Provisional application No. 62/072,880, filed on Oct. 30, 2014.

(51) Int. Cl.
*H04W 72/14*     (2009.01)
*H04W 72/12*     (2009.01)
*H04W 72/04*     (2009.01)
(Continued)

(52) U.S. Cl.
CPC ........... *H04W 72/14* (2013.01); *H04L 1/0003* (2013.01); *H04L 5/0055* (2013.01);
(Continued)

(58) Field of Classification Search
CPC ..... H04W 24/00; H04W 28/00; H04W 72/12; H04W 72/1226; H04W 74/00;
(Continued)

(56) References Cited

U.S. PATENT DOCUMENTS

| 2013/0223299 | A1* | 8/2013 | Yang | H04L 1/1685 |
| | | | | 370/280 |
| 2013/0301421 | A1* | 11/2013 | Yi | H04W 52/0216 |
| | | | | 370/241 |

(Continued)

FOREIGN PATENT DOCUMENTS

WO    WO-2010/129619 A2    11/2010

OTHER PUBLICATIONS

3GPP TS 36.213: "3rd Generation Partnership Project; Technical Specification Group Radio Access Network; Evolved Universal Terrestrial Radio Access (E-UTRA); Physical layer procedures (Release 12)", 3GPP Standard, 3rd Generation Partnership Project (3GPP), Mobile Competence Centre . 650, Route Des Lucioles, F-06921 Sophia-Anti Polis Cedex, France, vol. RAN WG11, No. V12.3.0, Sep. 26, 2014 (Sep. 26, 2014), pp. 1-212, XP050926112, [retrieved on Sep. 26, 2014] Section 7.3 Section 8.3 Sections 10.1.2 and 10.1.3.

(Continued)

*Primary Examiner* — Ashley Shivers
(74) *Attorney, Agent, or Firm* — Anthony R. Morris

(57) ABSTRACT

Apparatus and methods, in one or more aspect, provide feedback with respect to downlink grant feedback communications received by a user equipment (UE). The apparatus and methods monitor for signals from a network entity on one or more channels, and determine, based on the monitoring, whether one or more grants are received and whether UE data is received on the one or more channels. Further, the apparatus and methods generate a feedback indication hav-
(Continued)

ing a feedback value determined according to a feedback rule and based on whether the one or more grants and the UE data are received. Additionally, the apparatus and methods transmit the feedback indication to the network entity on a resource determined according to the feedback rule and based on whether the one or more grants and the UE data are received.

26 Claims, 13 Drawing Sheets

(51) Int. Cl.
  *H04W 76/04* (2009.01)
  *H04W 74/00* (2009.01)
  *H04L 5/00* (2006.01)
  *H04L 1/00* (2006.01)
  *H04W 88/02* (2009.01)

(52) U.S. Cl.
  CPC ..... *H04W 72/042* (2013.01); *H04W 72/1278* (2013.01); *H04W 74/006* (2013.01); *H04W 76/048* (2013.01); *H04L 5/001* (2013.01); *H04W 88/02* (2013.01)

(58) Field of Classification Search
  CPC ............. H04W 74/002; H04W 74/006; H04W 72/042; H04W 72/14; H04W 72/1278; H04W 76/048
  See application file for complete search history.

(56) References Cited

U.S. PATENT DOCUMENTS

2014/0293975 A1    10/2014  Kim et al.
2017/0063516 A1*   3/2017   Miao ........................ H04L 1/18

OTHER PUBLICATIONS

Holma H., et al., "LTE for UMTS: Evolution to LTE-Advanced: Second Edition", Jan. 1, 2011 (Jan. 1, 2011), Wiley, XP055235498, pp. 86-123, p. 86-p. 91 p. 97-p. 98 p. 120-p. 123.
International Search Report and Written Opinion—PCT/US2015/052196—ISA/EPO—Dec. 18, 2015. (14 total pages).

* cited by examiner

FEEDBACK SIGNAL MANAGEMENT FOR LOW LATENCY WIRELESS COMMUNICATIONS

CLAIM OF PRIORITY

This is an application claiming priority to Provisional Application No. 62/072,880 entitled "FEEDBACK SIGNAL MANAGEMENT FOR LOW LATENCY WIRELESS COMMUNICATIONS," filed on Oct. 30, 2014, and assigned to the assignee hereof and hereby expressly incorporated by reference herein.

BACKGROUND

The described aspects relate generally to wireless communication systems. More particularly, the described aspects relate to techniques for feedback signal management for low latency wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing LTE, a user equipment (UE) served by one or more eNodeBs can receive control channels, which provide resource grants for transmitting or receiving UE data, and one or more data bearer channels, which provide UE data. With development of lower latency communications, a shorter transmission time interval (TTI) (e.g., a TTI less than the 1 millisecond TTI of LTE) is supported. When a UE operates using lower latency communications with a network, the UE may asynchronously or simultaneously receive one or more grants from the network at different stages. In order to maintain proper low latency communication with an eNodeB, the UE may transmit an acknowledge (ACK) or a negative acknowledge (NACK) message to the eNodeB to indicate whether the one or more grants are successfully received.

Therefore, there is a desire for improvements in techniques for managing feedback signals to the network when the UE receives one or more grants from the network when operating with lower latency communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, for example, a method of providing feedback with respect to downlink communications received by a user equipment (UE), comprising monitoring for signals from a network entity on one or more channels. Further, the example method may include determining, based on the monitoring, whether one or more grants are received and whether UE data is received on the one or more channels. In addition, the example method may include generating a feedback indication having a feedback value determined according to a feedback rule and based on whether the one or more grants and the UE data are received. Further still, the example method may include transmitting the feedback indication to the network entity on a resource determined according to the feedback rule and based on whether the one or more grants and the UE data are received.

In another aspect of the disclosure, for example, a computer readable medium storing computer executable code for providing feedback with respect to downlink communications received by a user equipment (UE), comprising code for monitoring for signals from a network entity on one or more channels. In addition, the example computer readable medium may include code for determining, based on the monitoring, whether one or more grants are received and whether UE data is received on the one or more channels. Further, the example computer readable medium may include code for generating a feedback indication having a feedback value determined according to a feedback rule and based on whether the one or more grants and the UE data are received. Further still, computer readable medium may include code for transmitting the feedback indication to the network entity on a resource determined according to the feedback rule and based on whether the one or more grants and the UE data are received.

In another aspect of the disclosure, for example, an apparatus for providing feedback with respect to downlink communications received by a user equipment (UE), comprising: means for monitoring for signals from a network entity on one or more channels. In addition, the example apparatus may include means for determining, based on the monitoring, whether one or more grants are received and whether UE data is received on the one or more channels. Further, the example apparatus may include means for generating a feedback indication having a feedback value determined according to a feedback rule and based on whether the one or more grants and the UE data are received. Further still, the example apparatus may include means for transmitting the feedback indication to the network entity on a resource determined according to the feedback rule and based on whether the one or more grants and the UE data are received.

In another aspect of the disclosure, for example, an apparatus for providing feedback with respect to downlink communications received by a user equipment (UE), comprising: a transceiver configured to receive signals from a network entity on one or more channels. The example apparatus may additionally include a processor in communication with the transceiver, the processor including a channel monitoring component configured to monitor for the signals from the network entity on the one or more channels, a receipt condition determiner component configured to determine, based on the monitoring, whether one or more grants are received and whether UE data is received on the one or more channels; a feedback indication generator component configured to generate a feedback indication having a feedback value determined according to a feedback rule and based on whether the one or more grants and the UE data are received, and a transmitter configured to transmit the feedback indication to the network entity on a resource determined according to the feedback rule and based on whether the one or more grants and the UE data are received. Further the example apparatus may include a memory coupled to the processor to store the feedback indication and the feedback value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
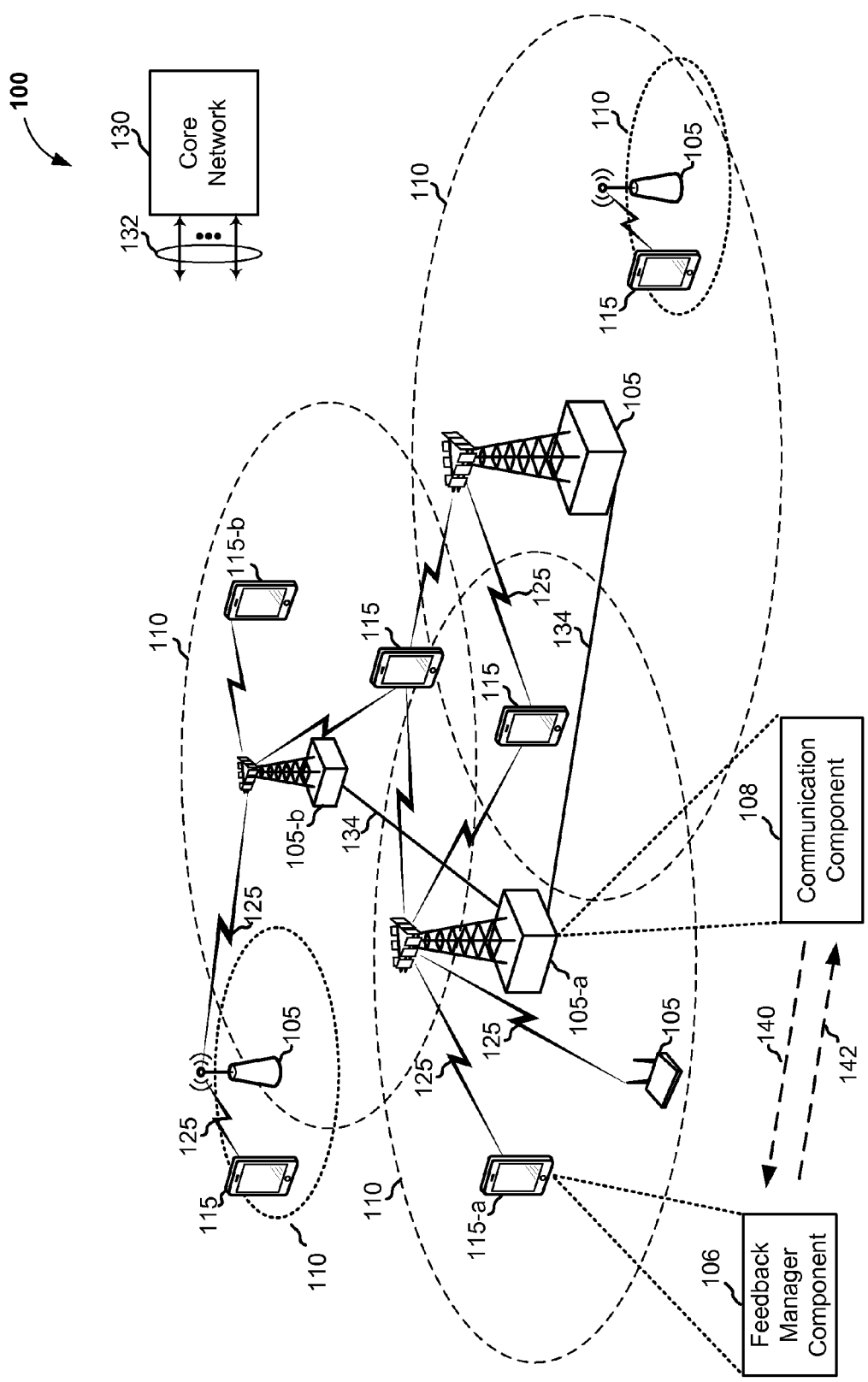
FIG. 1 is a block diagram illustrating a wireless communication system in which feedback signal management may be implemented in accordance with the present aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, the term "component" as used herein may be one of the parts that make up a system, may be hardware or software or some combination thereof, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer readable medium. Computer readable media includes computer storage media. Storage media may be any available media that can be accessed by a computer. By way of example, and not limitation, such computer readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer readable media.

The present disclosure presents various aspects for managing feedback with respect to downlink communications received at a UE in different stages, such as when the UE is operating using lower latency communications. It is to be appreciated that the term "lower latency communications" as used herein, whether in context to ultra low latency (ULL) communications, very low latency (VLL) communications, etc., can refer to communications that utilize a transmission time interval (TTI) less than that of an underlying communication technology relating to the lower latency communications. For example, in lower latency communications for LTE, the lower latency communications use a TTI that, in one aspect, is less than 1 subframe in duration, or, in other words, is less than 1 millisecond (ms) in duration. Further, for example in one aspect, such lower latency communications may use a TTI having a duration as low as one symbol. In addition, in some configurations, such lower latency communications can be superimposed or punctured over communications for the underlying communication technology (e.g., over LTE in the above example). Moreover, in this regard, some network nodes may support both communications using the underlying communication technology and the lower latency communications using different TTIs (e.g., but may support both over the same or similar frequency resources).

When a UE operates in communication with a network using lower latency communications, the UE may receive different portions of a grant, and different types of grants, from the network at different stages. For example, an eNodeB may transmit and the UE may receive an initial or first stage downlink (DL) grant, also referred to as a Stage 0 DL grant, which may occur infrequently and which may assign parameters that change relatively infrequently. For instance, the first stage DL grant may assign parameters such as, but not limited to, one or more of a modulation coding scheme (MCS) parameter, a precoding parameter, and a power control parameter, etc., for communication over a resource. Further, for example, the eNodeB may transmit and the UE may receive a subsequent or second stage DL grant, also referred to as a Stage 1 DL grant, which may assign parameters that change relatively more frequently (as compared to the parameters of the first stage DL grant), such as, but not limited to, the actual DL resources. Additionally, for example, the eNodeB may transmit and the UE may receive an initial or first stage uplink (UL) grant, also referred to as a Stage 0 UL grant, which may assign UL communication parameters that change relatively infrequently (as compared to the parameters of the first stage DL grant), such as, but not limited to, the actual UL transmission resources. Moreover, based on the received second stage DL grant, the eNodeB may transmit and the UE may receive UE data on the granted resources.

According to the present aspects, the UE monitors for signals from an eNodeB on one or more channels and determines whether one or more of the above mentioned grants are received and whether UE data is received. In response to these determinations, the UE generates and transmits a feedback indication on a selected resource based on the received one or more grants and/or UE data. For example, the UE may execute a feedback rule, which is also known by the eNodeB, where the feedback rule dictates a feedback value, e.g., an ACK or NACK or DTX signal, for the feedback indication and the resource to use for transmitting the feedback indication. As a result, the transmission by the UE of the feedback indication having a particular feedback value, and on a particular resource, provides a combination of explicit and implicit signaling to the eNodeB as to whether the one or more grants were received and whether UE data was received.

Therefore, the present aspects may be especially useful in when the UE operates in communication with the eNodeB using lower latency communications, as the presently described feedback indication having the particular feedback value, transmitted on the particular resource, provides a concise feedback mechanism that efficiently operates in a lower latency environment.

Referring first to FIG. 1, a diagram illustrates an example of a wireless communication system 100, in accordance with an aspect of the present disclosure. The wireless communication system 100 includes a plurality of access points (e.g., base stations, eNBs, or WLAN access points) 105, also referred to herein as network nodes, a number of user equipment (UEs) 115, and a core network 130. Access points or network entities 105 may include a communication component 108, which may include a scheduling component and a transmitting component, configured to communicate one or more signals 140 including resource grants and/or UE data to UEs, including UE 115-a, in lower latency communications. Correspondingly, one or more of UEs, such as UE 115-a, may include a feedback manager component 106 configured to monitor for one or more signals 140, determine reception of resource grants and/or UE data, and transmit a feedback indication signal 142 to access point or network entity 105 to indicate whether the resource grants and/or UE data were properly received and/or decoded.

In an aspect, for example, feedback manager component 106 may be configured to generate feedback indication signal 142 including a feedback indication having a feedback value determined according to a feedback rule and based on whether the one or more grants and/or the UE data are received. For example, the feedback indication may be an ACK message, a NACK message, or a discontinuous transmission (DTX) signal. Further, for example, feedback manager component 106 additionally may be configured to transmit the feedback indication to the network on a resource determined according to the feedback rule and based on whether the one or more grants and the UE data are received. As such, feedback manager component 106 may transmit feedback indication signal 142 having a particular feedback value, and on a particular resource, to provide a combination of explicit and implicit signaling to access point or network entity 105 as to whether the one or more grants were received and/or whether UE data was received. For instance, feedback indication signal 142 may indicate whether UE 115-a received a first stage uplink grant from access point or network entity 105, whether UE 115-a received a first stage downlink grant from access point or network entity 105, whether UE 115-*a* received a second stage downlink grant from access point or network entity 105, and/or whether UE 115-*a* received downlink data from access point or network entity 105 and whether the downlink data was successfully decoded UE 115-*a*.

Access points or network entities 105 may communicate control information and/or UE data with the core network 130 through backhaul links 132. In examples, the access points or network entities 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communication system 100 may be configured to operate on multiple hierarchical layers in which one or more of the UEs 115 and one or more of the access points or network entities 105 may be configured to support transmissions on a hierarchical layer that has a reduced latency with respect to another hierarchical layer. In some examples a hybrid UE 115-*a* may communicate with access point or network entity 105-*a* on both a first hierarchical layer that supports first layer transmissions with a first subframe type and a second hierarchical layer that supports second layer transmissions with a second subframe type. For example, access point or network entity 105-*a* may transmit subframes of the second subframe type that are time division duplexed with subframes of the first subframe type.

In some examples, hybrid UE 115-*a* may acknowledge receipt of a transmission by providing ACK/NACK for the transmission through, for example, a HARQ scheme. Acknowledgments from hybrid UE 115-*a* for transmissions in the first hierarchical layer may be provided, in some examples, after a predefined number of subframes following the subframe in which the transmission was received. The hybrid UE 115-*a*, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point or network entity 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point or network entity 105-*b* and UE 115-*b* may communicate on the second hierarchical layer through transmissions of subframes of the second subframe type. Access point or network entity 105-*b* may transmit subframes of the second subframe type exclusively, or may transmit one or more subframes of the first subframe type on the first hierarchical layer that are time division multiplexed with subframes of the second subframe type. Second layer UE 115-*b*, in the event that access point or network entity 105-*b* transmits subframes of the first subframe type, may ignore such subframes of the first subframe type. Thus, second layer UE 115-*b* may acknowledge receipt of transmissions in a same subframe as the subframe in which the transmissions are received. Thus, second layer UE 115-*b* may operate with reduced latency compared to UEs 115 that operate on the first hierarchical layer.

The access points or network entities 105 may wirelessly communicate with the UEs 115 via one or more access point antennas. Each of the access points or network entities 105 sites may provide communication coverage for a respective coverage area 110. In some examples, access points or network entities 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communication system 100 may include access points or network entities 105 of different types (e.g., macro, micro, and/or pico base stations). The access points or network entities 105 may also utilize different radio technologies, such as cellular and/or WLAN radio access technologies. The access points or network entities 105 may be associated with the same or different access networks or operator deployments. The coverage areas of different access points or network entities 105, including the coverage areas of the same or different types of access points or network entities 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points or network entities 105. The wireless communication system 100 may be a Heterogeneous LTE/LTE-A/ULL LTE network in which different types of access points provide coverage for various geographical regions. For example, each access point or network entity 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points or network entities 105 via a backhaul link 132 (e.g., S1 interface, etc.). The access points or network entities 105 may also communicate with one another, e.g., directly or indirectly via backhaul links 134 (e.g., X2 interface, etc.) and/or via backhaul links 132 (e.g., through core network 130). The wireless communication system 100 may support synchronous or asynchronous operation. For synchronous operation, the access points or network entities 105 may have similar frame timing, and transmissions from different access points or network entities 105 may be approximately aligned in time. For asynchronous operation, the access points or network entities 105 may have different frame timing, and transmissions from different access points or network entities 105 may not be aligned in time. Furthermore, transmissions in the first hierarchical layer and second hierarchical layer may or may not be synchronized among access points or network entities 105. The techniques described herein may be used for either synchronous or asynchronous operations.

The UEs 115 are dispersed throughout the wireless communication system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communication system 100 may include uplink (UL) transmissions from a UE 115 to an access point or network entity 105, and/or downlink (DL) transmissions, from an access point or network entity 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points or network entities 105 through, for example, Multiple Input Multiple Output (MIMO), carrier aggregation (CA), Coordinated Multi-Point (CoMP), or other schemes. MIMO techniques use multiple antennas on the access points or network entities 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points or network entities 105 to improve overall transmission quality for UEs 115 as well as increasing network and spectrum utilization.

As mentioned, in some examples access points or network entities 105 and UEs 115 may utilize carrier aggregation to transmit on multiple carriers. In some examples, access points or network entities 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communication system 100, as well as other features and functions related to communications in such systems, are provided below with reference to the following figures.

Figure 2:
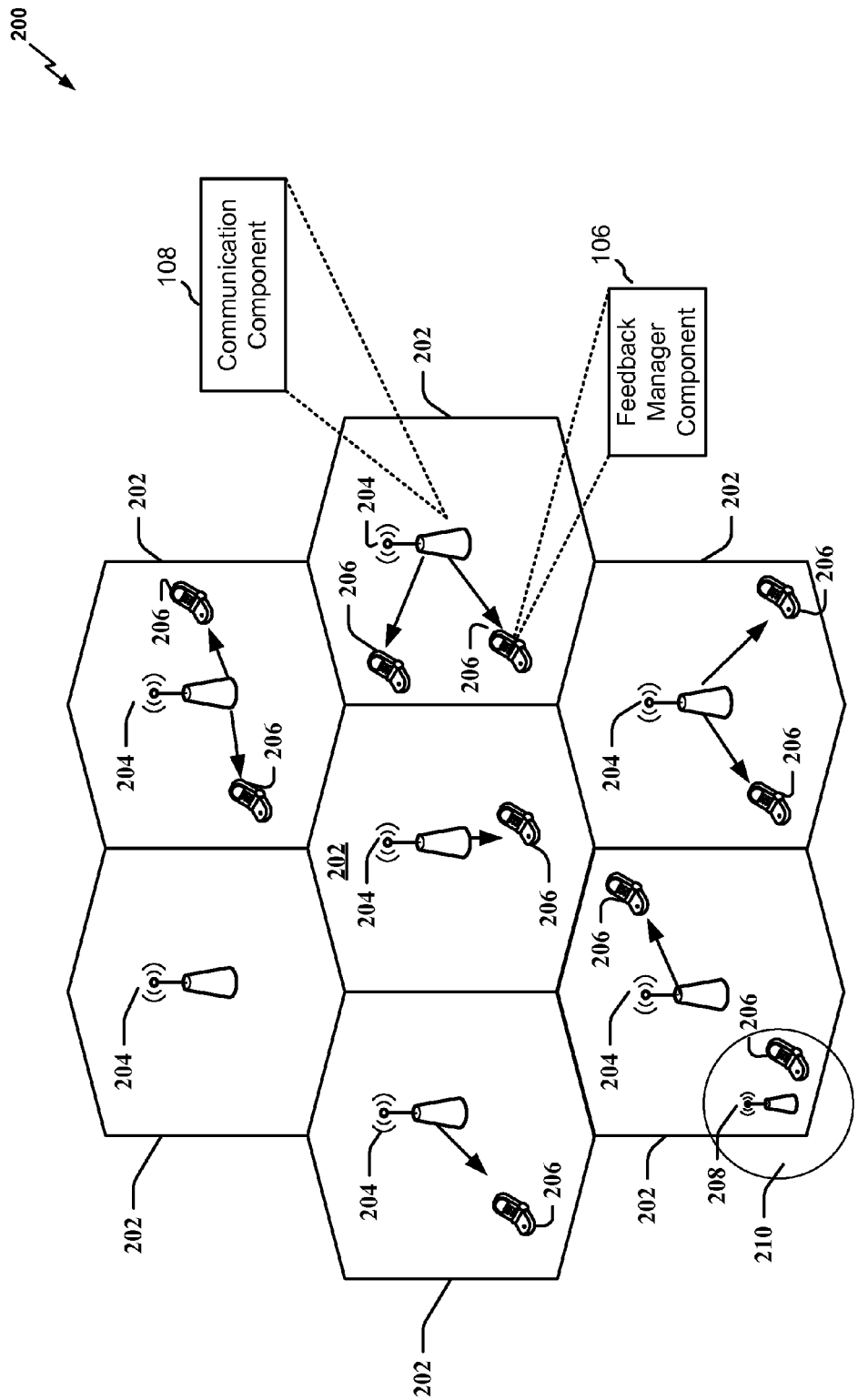
FIG. 2 is a diagram illustrating an example of an access network in which feedback signal management may be implemented in accordance with the present aspects.

FIG. 2 is a diagram illustrating an example of an access network 200 in an LTE network architecture, including lower latency communications, in which one or more UEs 206 may include feedback manager component 106 to provide feedback signal management and signaling to one or more eNBs 208 in response to communication component 108 transmitting one or more resource grants and/or UE data, as described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to a core network for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE or ULL LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate, or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
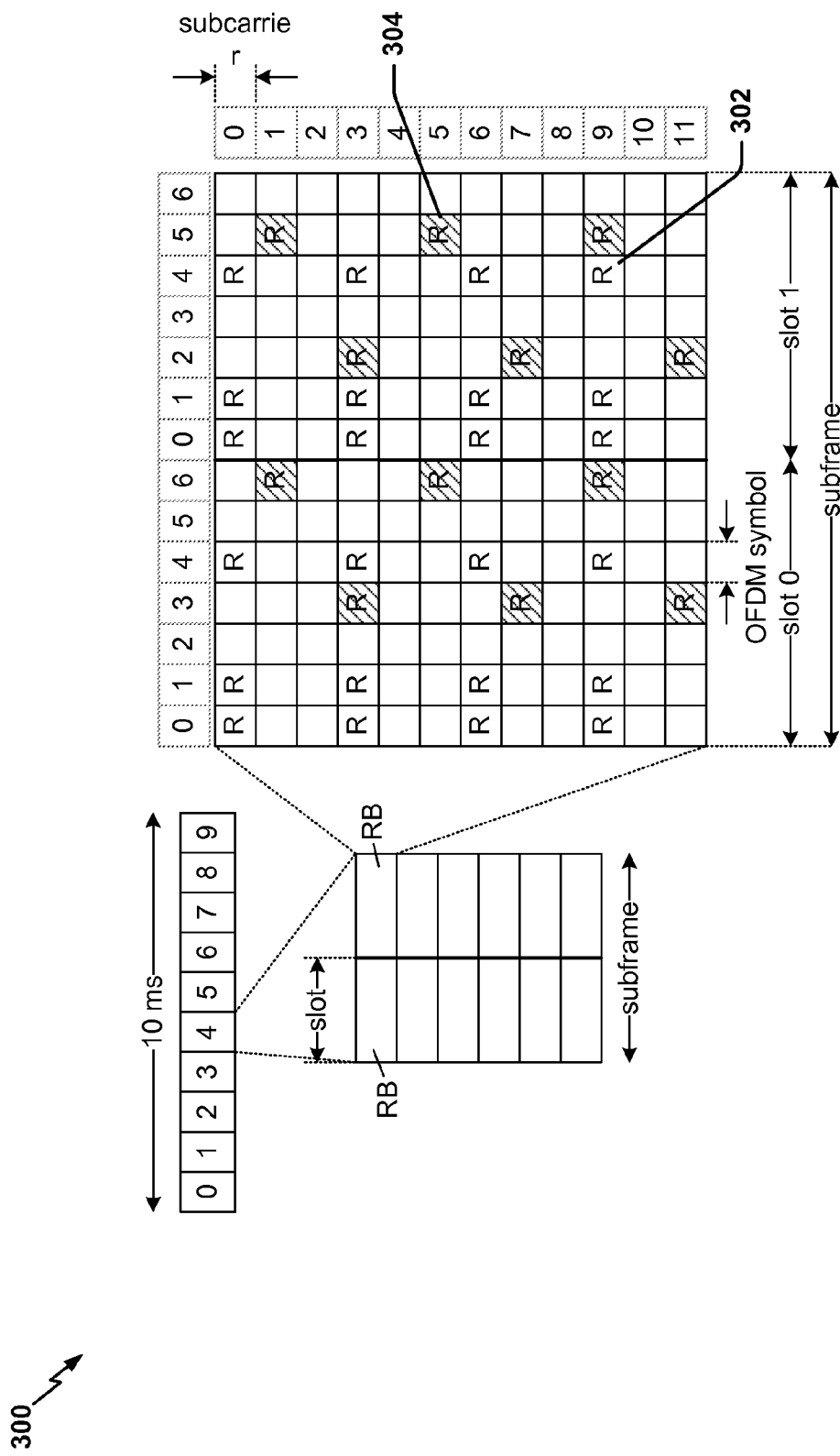
FIG. 3 is a diagram illustrating an example of a DL frame structure in LTE that may be used in conjunction with the present aspects.

FIG. 3 is a diagram 300 illustrating an example of a DL frame structure in LTE, which, in some examples, may be utilized in conjunction with the ULL LTE DL frame structure utilized by UEs and network nodes in the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
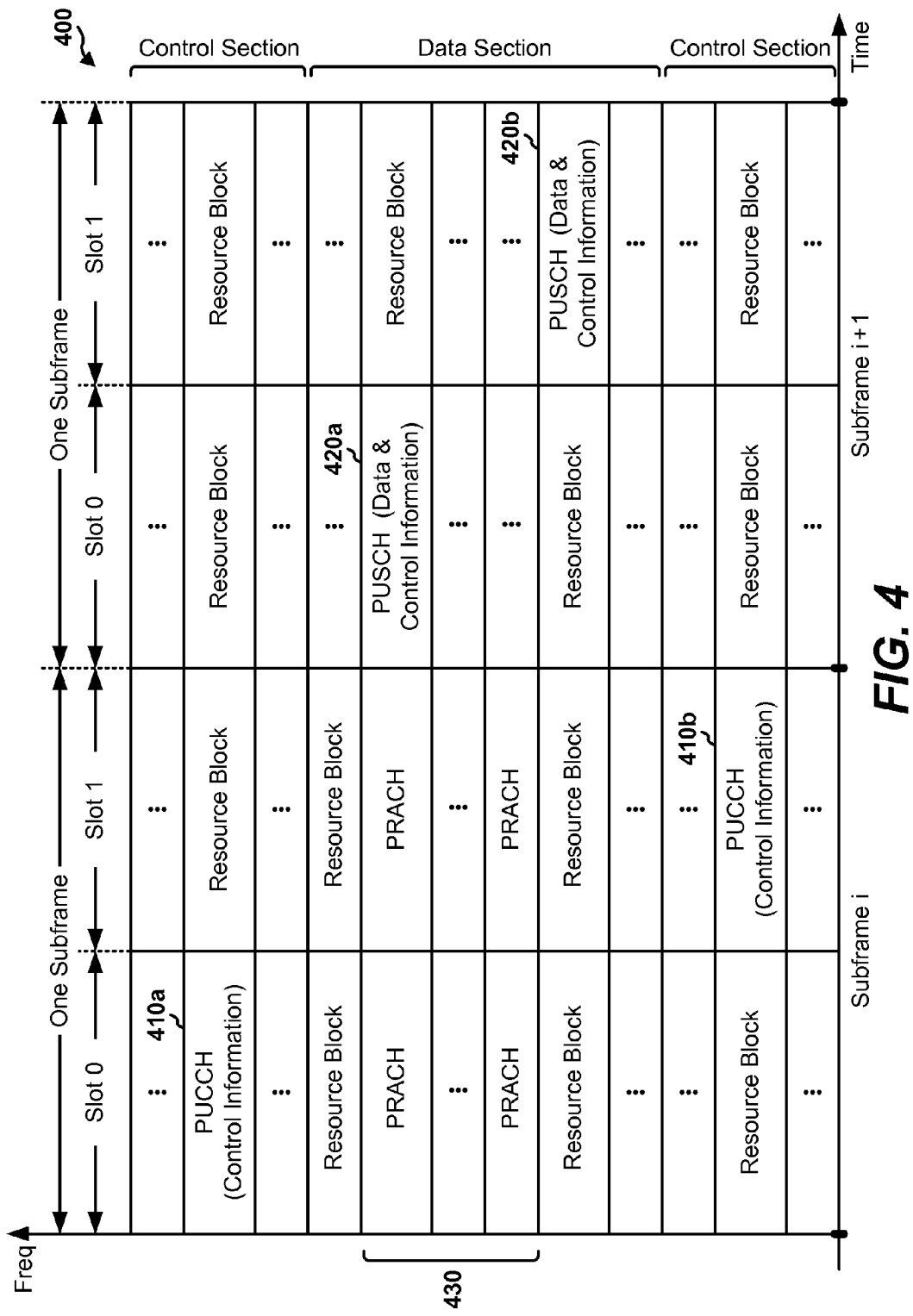
FIG. 4 is a diagram illustrating an example of an UL frame structure in LTE that may be used in conjunction with the present aspects.

FIG. 4 is a diagram 400 illustrating an example of an UL frame structure in LTE which, in some examples, may be utilized in conjunction with the ULL LTE UL frame structure and feedback signaling utilized by UEs and network nodes in the present disclosure. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
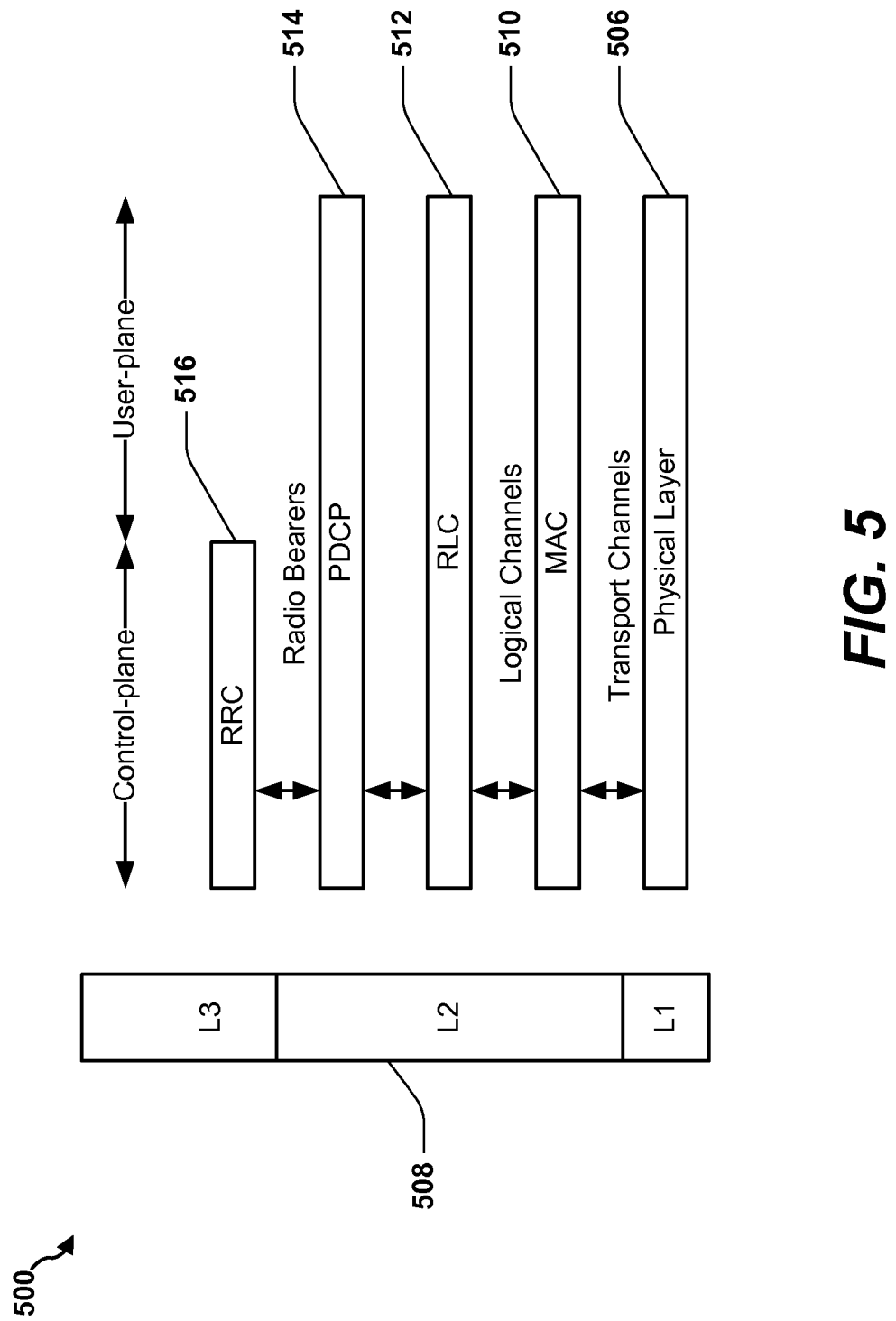
FIG. 5 is a diagram illustrating an example of a radio protocol architecture for the user and control planes that may be used in conjunction with the present aspects.

FIG. 5 is a diagram 500 illustrating an example of a radio protocol architecture for the user and control planes in LTE and ULL LTE by which feedback signal management may be implemented, as described herein. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
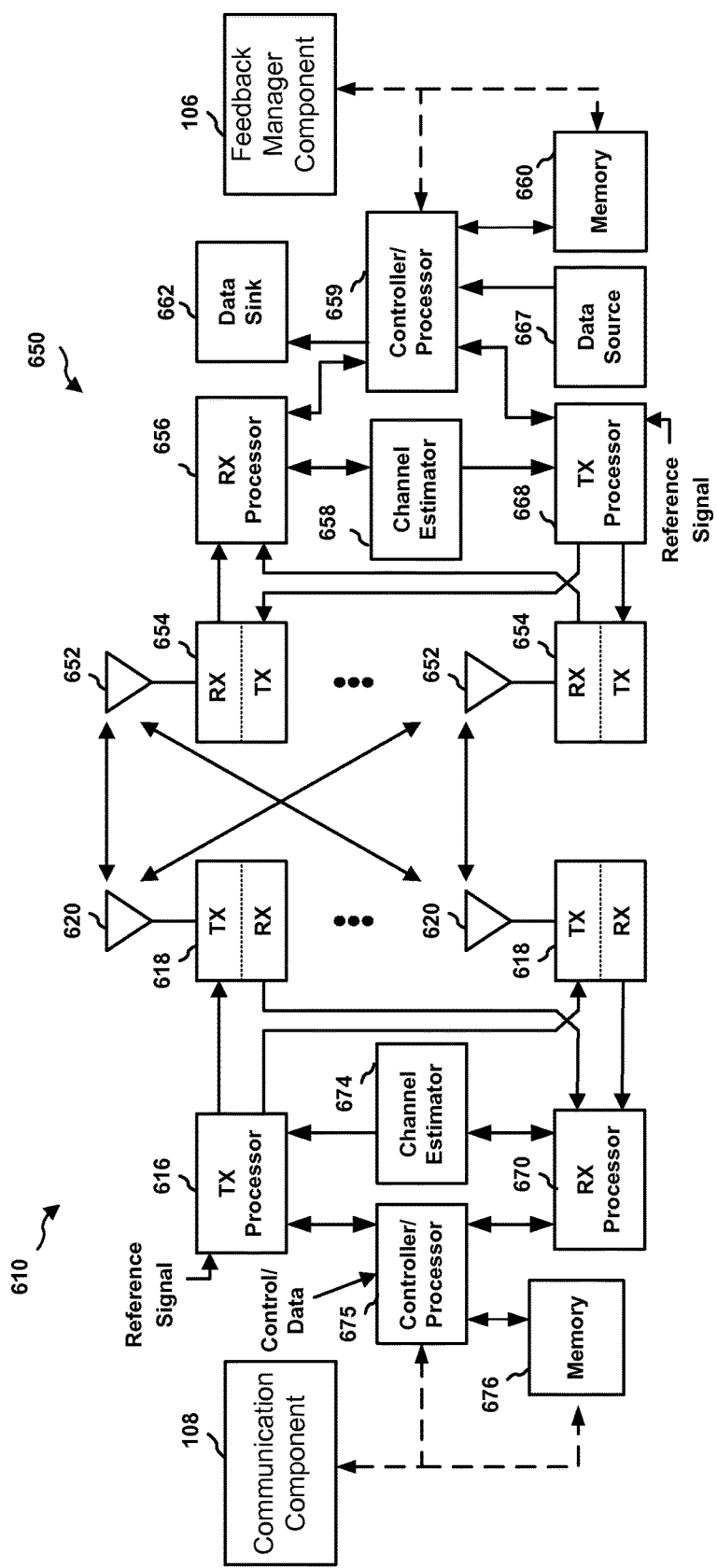
FIG. 6 is a diagram illustrating an example of an evolved Node B and user equipment in an access network in which feedback signal management may be implemented in accordance with the present aspects.

FIG. 6 is a block diagram of an eNB 610 in communication with a UE 650 in an access network, including lower latency communications, in which UE 650 may include feedback manager component 106 to provide feedback signal management and signaling to eNB 610 in response to communication component 108 transmitting one or more resource grants and/or UE data, as described herein. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
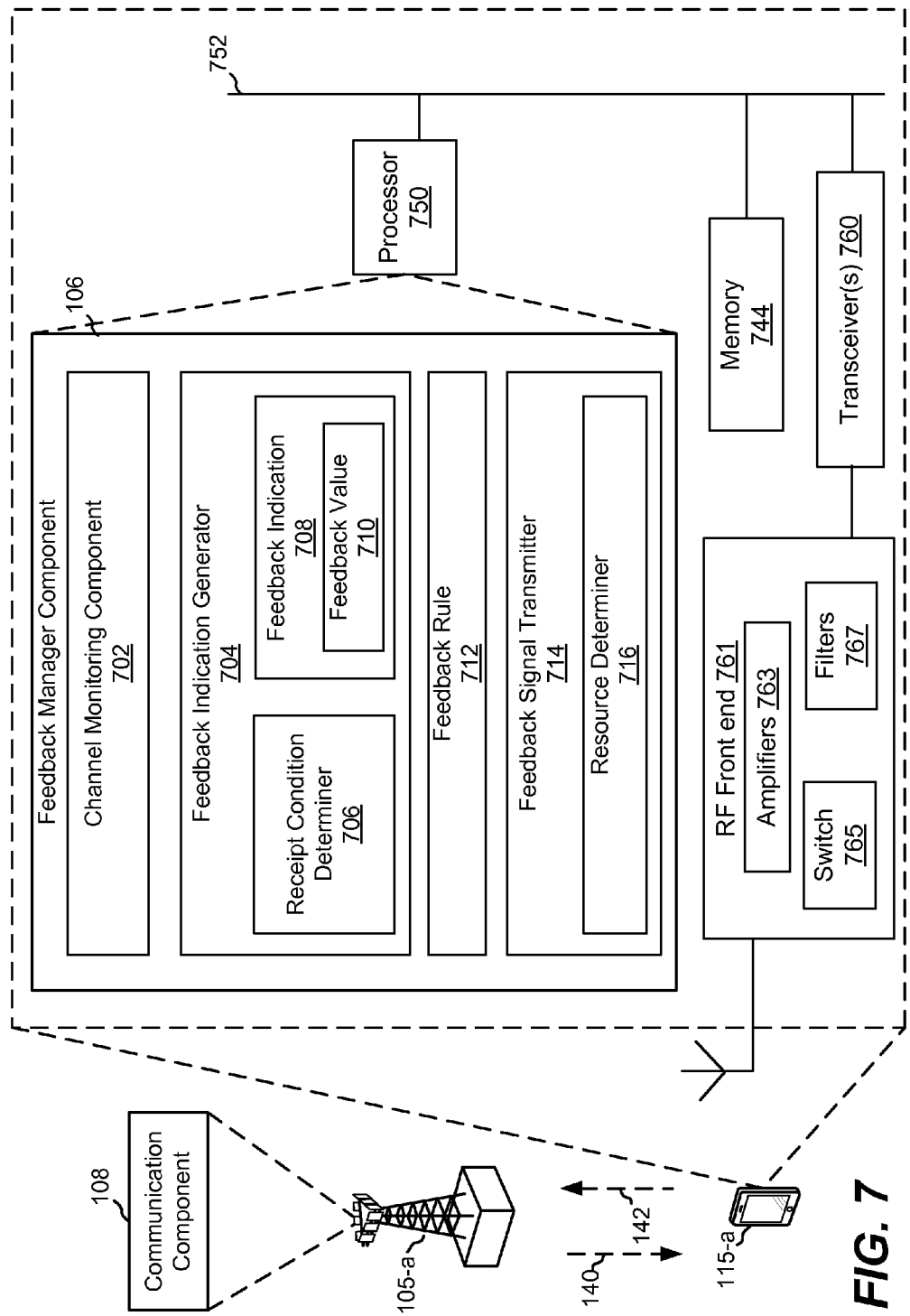
FIG. 7 is a diagram illustrating one or more components by which feedback signal management may be implemented in accordance with the present aspects.

Referring to FIG. 7, one or more components of UE 115-*a* of FIG. 1, by which feedback signal management may be implemented, are illustrated with respect to feedback manager component 106. It should be noted that each of the one or more components of UE 115-*a* may be implemented as software, hardware, firmware, or any combination thereof. As noted above, UE 115-*a* or processor 750 thereof generally operates feedback manager component 106 to monitor for one or more signals 140 from access point or network entity 105 on one or more channels and determines whether one or more grants are received and/or whether UE data is received. For example, UE 115-*a* may execute a feedback rule 712, which is also known by access point or network entity 105, where feedback rule 712 dictates a feedback value 710, e.g., an ACK or NACK or DTX signal, for a feedback indication 708 and the resource to use for transmitting feedback indication 708. It should be noted that feedback rule 712 may be any combination of one or more rules that results in determining a feedback indication and a feedback resource. In response to these determinations, UE 115-*a* operates feedback manager component 106 to generate and transmit feedback indication signal 142 on a particular resource based on the received one or more grants and/or UE data, where feedback indication signal 142 is defined by a combination of feedback indication 708 and the utilized transmission resource. Thus, the transmission by UE 115-*a* of feedback indication signal 142 having a particular feedback value 710, and on a particular resource, provides a combination of explicit and implicit signaling to access point or network entity 105 as to whether the one or more grants were received and whether UE data was received.

More specifically, for example, in one aspect, one or more signals 140 transmitted from access point or network entity 105 based on operation of communication component 108 may include an initial or first stage downlink (DL) grant, also referred to as a Stage 0 DL grant, which may occur infrequently and which may assign parameters that change relatively infrequently. For instance, the first stage DL grant may assign parameters such as, but not limited to, one or more of a modulation coding scheme (MCS) parameter, a precoding parameter, and a power control parameter, etc., for communication over a resource. Further, for example, access point or network entity 105 may transmit and UE 115-*a* may receive a subsequent or second stage DL grant, also referred to as a Stage 1 DL grant, which may assign parameters that change relatively more frequently (as compared to the parameters of the first stage DL grant), such as, but not limited to, the actual DL resources. Additionally, for example, access point or network entity 105 may transmit and UE 115-*a* may receive an initial or first stage uplink (UL) grant, also referred to as a Stage 0 UL grant, which may assign UL communication parameters that change relatively infrequently (as compared to the parameters of the first stage DL grant), such as, but not limited to, the actual UL transmission resources. Moreover, based on the received second stage DL grant, access point or network entity 105 may transmit and UE 115-*a* may receive UE data on the granted resources.

Further, for example, UE 115-*a* may operate channel monitoring component 702 to monitor one or more downlink channels for receipt of one or more signals 140 and/or one or more resource grants and/or one or more UE data. For example, channel monitoring component 702 may operate in conjunction with a receiver or transceiver of UE 115-*a* and listen or measure for one or more signals 140, for instance but not limited hereto, according to a schedule.

Additionally, for example, UE 115-*a* may operate feedback indication generator 704 to determine whether one or more resources and/or UE data are received, and to generate feedback indication 708 according to feedback rule 712. In an aspect, for instance, feedback indication generator 704 may include a receipt condition determiner 706 that is in communication with channel monitoring component 702, and which can determine a received or not received condition one or more resources and/or UE data based on the monitored one or more signals 140. A more detailed example of receipt condition determiner 706 is discussed below with respect to FIG. 8. Accordingly, based on the conditions determined by receipt condition determiner 706 and based on executing feedback rule 712, feedback indication generator 704 can generate feedback indication 708 having a particular feedback value 710.

Moreover, for example, UE 115-*a* may operate feedback signal transmitter 714 to obtain feedback indication 708 and determine a particular resource for transmission of feedback indication signal 142. In an aspect, for example, feedback signal transmitter 714 is in communication with feedback indication generator 704 and receives or otherwise obtains feedback indication 708. Further, in an aspect, for instance, feedback signal transmitter 714 may include a resource determiner 716, which is in communication with channel monitoring component and/or feedback indication generator 704 to receive or otherwise obtain information identifying what resource grants were received at UE 115-*a*. Accordingly, based on this input, resource determiner 716 may execute feedback rule 712 to determine the particular resource on which feedback indication 708 is to be transmitted. Thus, feedback signal transmitter 714 then transmits feedback indication signal 142, which includes feedback indication 708 and is further defined by the particular resource used for transmission.

In some aspects, UE 115-*a* also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Moreover, in an aspect, UE 115-*a* may include one or more transceivers 760 for receiving and transmitting radio transmissions. For instance, the one or more transceivers 760 may be configured to receive different kinds of radio signals, e.g., cellular, Wi-Fi, Bluetooth, GPS, etc. For example, in an aspect, one or more transceivers 760 may be in communication with or connected to a radio frequency (RF) front end 761 defined by, for instance one or more power amplifiers 763, one or more band specific filters 767, and one or more antennas 764. For example, one or more transceivers 760 may include a receiver and may include hardware and/or software code executable by one or more processors 750 for receiving signals from communication component 108 of network entity 105-*a* on one or more channels. Transceiver(s) 760 may further include a transmitter and may include hardware and/or software code executable by one or more processors 750 for transmitting feedback indication 708 to network entity 105-*a*.

Figure 8:
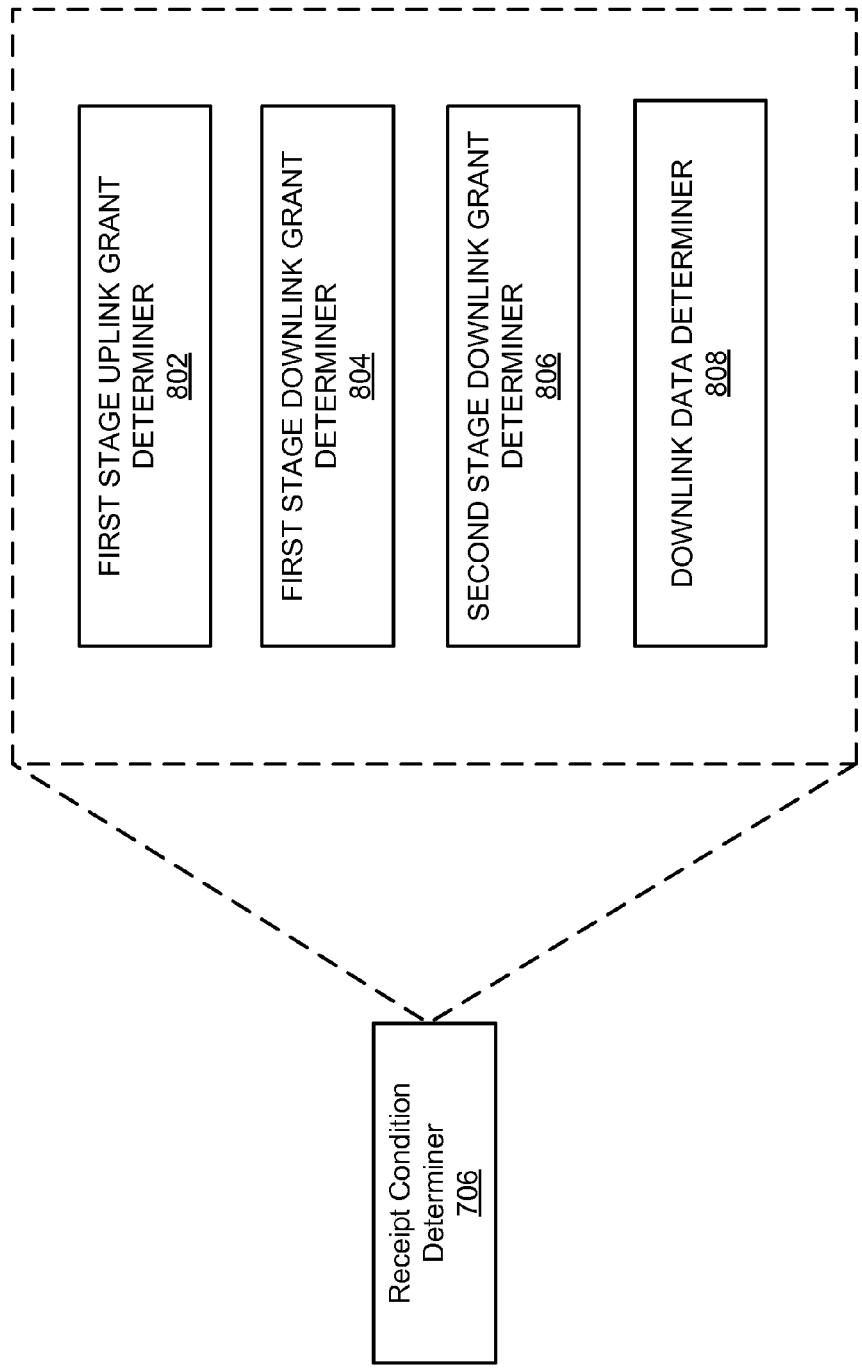
FIG. 8 is a diagram illustrating one or more components of a receipt condition determiner associated with the feedback signal management components described in FIG. 7.

Referring to FIG. 8, in an aspect, one non-limiting example of receipt condition determiner 706 may include a first stage uplink grant determiner 802, a first stage downlink grant determiner 804, a second stage downlink grant determiner 806, and a downlink data determiner 808, each of which may be implemented as software, hardware, firmware, or any combination thereof at UE 115-*a*.

In an aspect, for example, first stage uplink grant determiner 802 may be configured to determine whether the UE received a first stage uplink grant from access point or network entity 105. For example, first stage uplink grant determiner 802 may determine if UE 115-*a* received a Stage 0 UL grant from a network entity of a network. Accordingly, for example, first stage downlink grant determiner 804 may be configured to determine a first condition having a value that indicates whether UE 115-*a* received or did not receive a first stage downlink grant from access point or network entity 105.

Similarly, for example, second stage downlink grant determiner 806 may be configured to determine a second condition having a value that indicates whether UE 115-*a* received or did not receive a second stage downlink grant from access point or network entity 105. For example, second stage downlink grant determiner 806 may determine whether UE 115-*a* has received a Stage 1 DL grant from access point or network entity 105.

Further still, downlink data determiner 808 may be configured to determine a third condition having a value that indicates whether the UE 115-*a* received or did not receive downlink data and whether or not the downlink data is successfully decoded by UE 115-*a*. For example, downlink data determiner 808 may determine if UE 115-*a* has received UE data in the granted DL resources and whether the UE data is successfully decoded, e.g., passes a CRC check, by UE 115-*a*.

Figure 9:
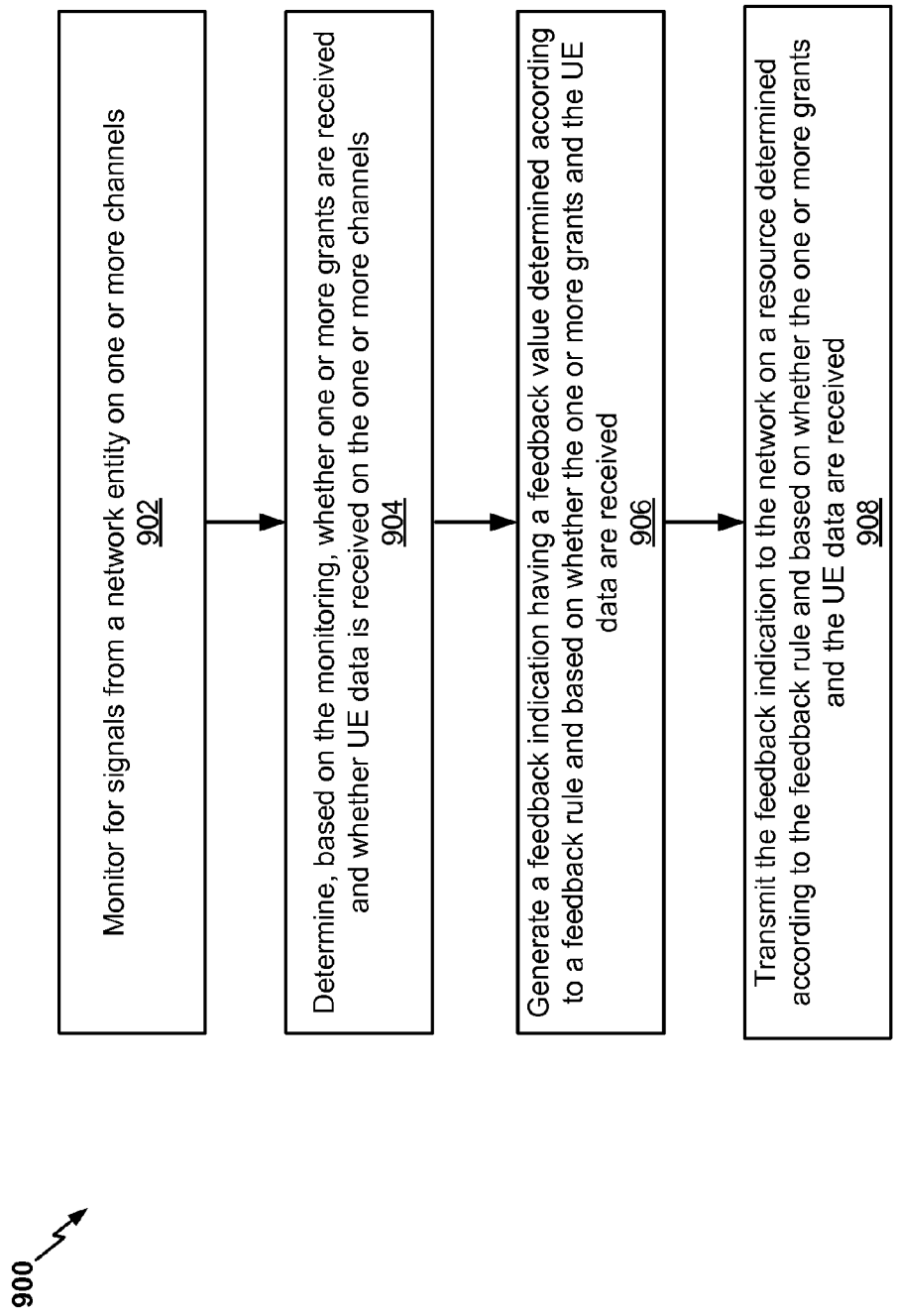
FIG. 9 is a flowchart of an aspect of a method of providing feedback with respect to downlink communications received by a UE in accordance with the present aspects.

Referring to FIG. 9, in an aspect, one non-limiting example of a method 900 of providing feedback with respect to downlink communications received by a UE, especially, for instance, in low latency communication environment. Method 900 may be operated by, for example, UE 115-*a* via execution of feedback manager component 106, as described herein. It should be noted that aspects are described with reference to one or more components and one or more methods that may perform the actions or functions described herein. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer readable media, or by any other combination of a hardware component and/or a software component capable of performing the described actions or functions.

At block 902, method 900 includes monitoring for signals from a network entity on one or more channels. In an aspect, for example, UE 115-*a* may include feedback manager component 106 and/or channel monitoring component 702 configured to monitor for signals from a network entity on one or more channels. For instance, the signals may be one or more signals 140, which may include one or more resource grants and/or one or more UE data. Moreover, the one of more resource grants may include one or more grants each transmitted in a plurality of different stages. For instance, a grant may include an initial or first stage transmitted on one resource and a subsequent or second stage transmitted on a different resource. For example, such a grant may include a Stage 0 DL grant and a Stage 1 DL grant, and/or a Stage 0 UL grant. In some aspects, such resource grants and UE data may be transmitted according to a low latency communication structure, e.g., where a TTI of the communication may be less than 1 ms or one LTE subframe, and in some cases may be as small as one symbol. UE 115-*a* may perform at least one of the monitoring for signals or the transmitting the feedback indication to the network entity in a transmission time interval (TTI) less than one subframe.

At block 904, method 900 includes determining, based on the monitoring, whether one or more grants are received and whether UE data is received on the one or more channels. In an aspect, for example, UE 115-*a* may include feedback manager component 106 and/or feedback indication generator 704 and/or receipt condition determiner 706 configured to determine, based on the monitoring, whether one or more grants are received and/or whether UE data is received on the one or more channels.

At block 906, method 900 includes generating a feedback indication having a feedback value determined according to a feedback rule and based on whether the one or more grants and the UE data are received. In an aspect, for example, UE 115-*a* may include feedback manager component 106 and/or feedback indication generator 704 configured to generate a feedback indication having a feedback value determined according to a feedback rule and based on whether the one or more grants and the UE data are received. In some examples, UE 115-*a* may perform at least one of the monitoring for signals or the transmitting the feedback indication to the network entity in a transmission time interval (TTI) less than one subframe.

At block 908, method 900 includes transmitting the feedback indication to the network on a resource determined according to the feedback rule and based on whether the one or more grants and the UE data are received. In an aspect, for example, UE 115-*a* may include feedback manager component 106 and/or feedback signal transmitter 714 configured to transmit the feedback indication to the network on a resource determined according to the feedback rule and based on whether the one or more grants and the UE data are received.

Figure 10:
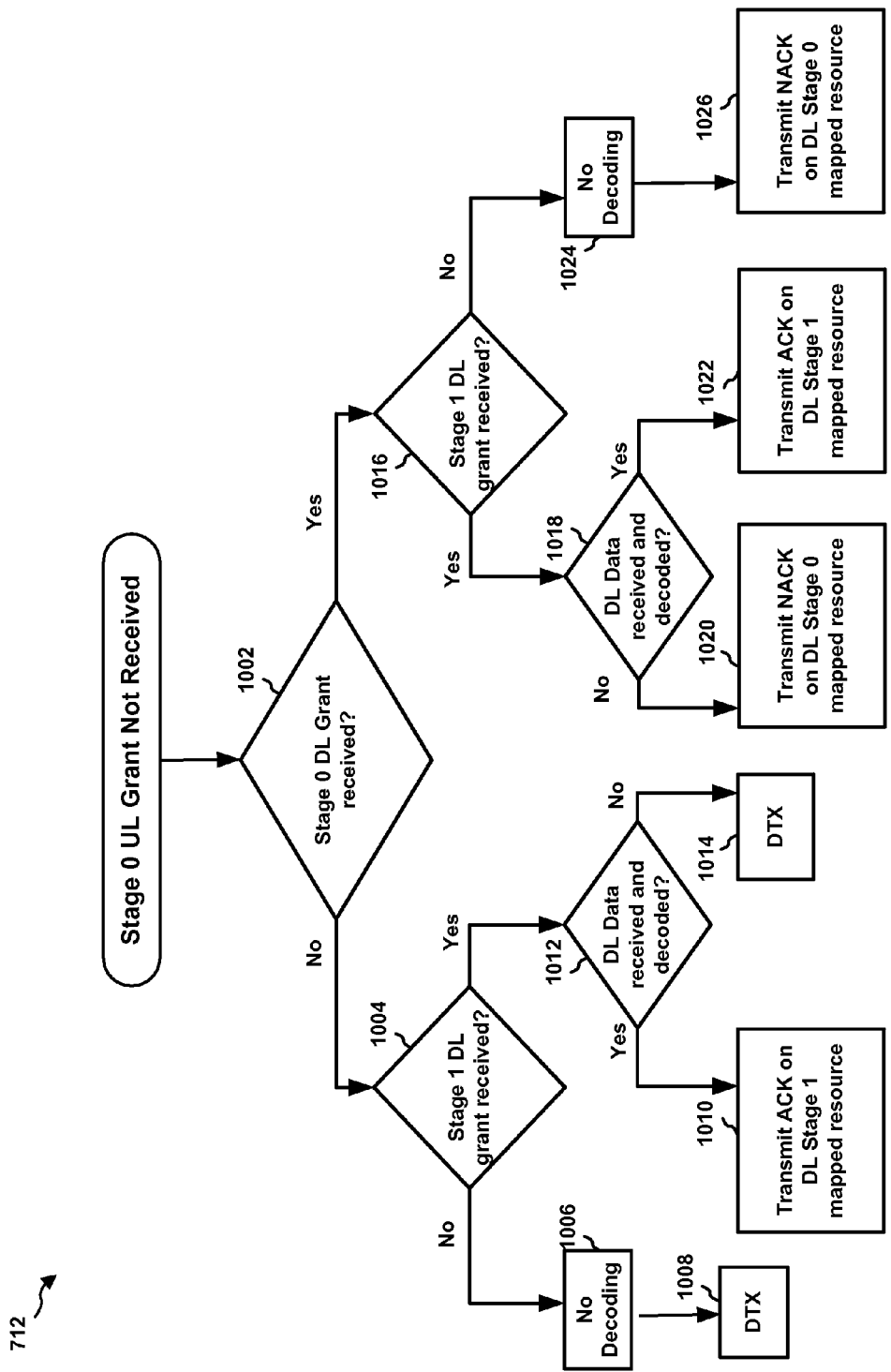
FIG. 10 is a diagram of an aspect of a rule flow in accordance with aspects of feedback signal management when a first stage uplink grant is not received.

Referring to FIG. 10, one example of feedback rule 712 (or a portion of feedback rule 712) used in operation of an aspect of method 900 and an aspect of feedback manager component 106 includes a rule flow that defines aspects of feedback signal management in response to a determination that a first stage uplink grant, e.g., Stage 0 UL grant, is not received. That is, UE 115-*a* and feedback manager component 106 may utilize this version of feedback rule 712 upon determining that the first stage uplink grant is not received by UE 115-*a*.

At 1002, feedback manager component 106 according to feedback rule 712 may determine if UE 115-*a* received a first stage downlink grant from access point or network entity 105. If UE 115-*a* received a first stage downlink grant, the rule flow may continue to 1016; if UE 115-*a* did not receive a first stage downlink grant, the rule flow may continue to 1004.

At 1004 and 1016, feedback manager component 106 according to feedback rule 712 may determine if UE 115-*a* received a second stage downlink grant from access point or network entity 105. If UE 115-*a* received a second stage downlink grant, the rule flow may respectively continue to 1012 or 1018; if UE 115-*a* did not receive a second stage downlink grant, the rule flow may respectively continue to 1006 or 1024, which indicates that no decoding can occur due to a CRS failure, and thus the rule flow respectively proceeds to 1008 and 1026.

At 1008, feedback manager component 106 according to feedback rule 712 determines to transmit a DTX signal, which indicates that no Stage 0 UL grant was received, no Stage 0 DL grant was received, and no Stage 1 DL grant was received (and hence no decoding has occurred).

At 1026, feedback manager component 106 according to feedback rule 712 determines to transmit a NACK over resources granted by and mapped to the first stage downlink grant (e.g., Stage 0 DL Grant), which indicates that the Stage 0 UL grant was not received, the Stage 0 DL grant was received, but that the Stage 1 DL grant was not received (and hence no decoding has occurred).

At 1012 and 1018, feedback manager component 106 according to feedback rule 712 may determine if UE 115-*a* received downlink data and if the downlink data is successfully decoded by UE 115-*a*. If UE 115-*a* received downlink data and the downlink data is successfully decoded by UE 115-*a*, the rule flow may respectively continue to 1010 or 1022; if UE 115-*a* did not receive downlink data or UE 115-*a* received the downlink data but the downlink data is not successfully decoded by UE 115-*a*, the rule flow may respectively continue to 1014 or 1020.

At 1014, feedback manager component 106 according to feedback rule 712 may determine to transmit a DTX signal, which indicates that the Stage 0 UL grant was not received, the Stage 0 DL grant was not received, the Stage 1 DL grant was received but that the data was not properly decoded.

At 1020, feedback manager component 106 according to feedback rule 712 determines to transmit a NACK over resources granted by and mapped to the first stage downlink grant (e.g., Stage 0 DL Grant), which indicates that the Stage 0 UL grant was not received, the Stage 0 DL grant was received, but that the Stage 1 DL grant was not received but was not decoded (e.g., CRC check fails).

At 1010 and 1022, feedback manager component 106 according to feedback rule 712 may determine to transmit an ACK over resources granted or mapped by the second stage downlink grant (e.g., Stage 1 DL grant). As such, the ACK at 1010 indicates that the Stage 0 UL grant was not received, the Stage 0 DL grant was not received, the Stage 1 DL grant was received and that the data was properly decoded (e.g., passed CRC check). Further, the ACK at 1022 indicates that the Stage 0 UL grant was not received, the Stage 0 DL grant was received, the Stage 1 DL grant was received and that the data was properly decoded (e.g., passed CRC check).

Figure 11:
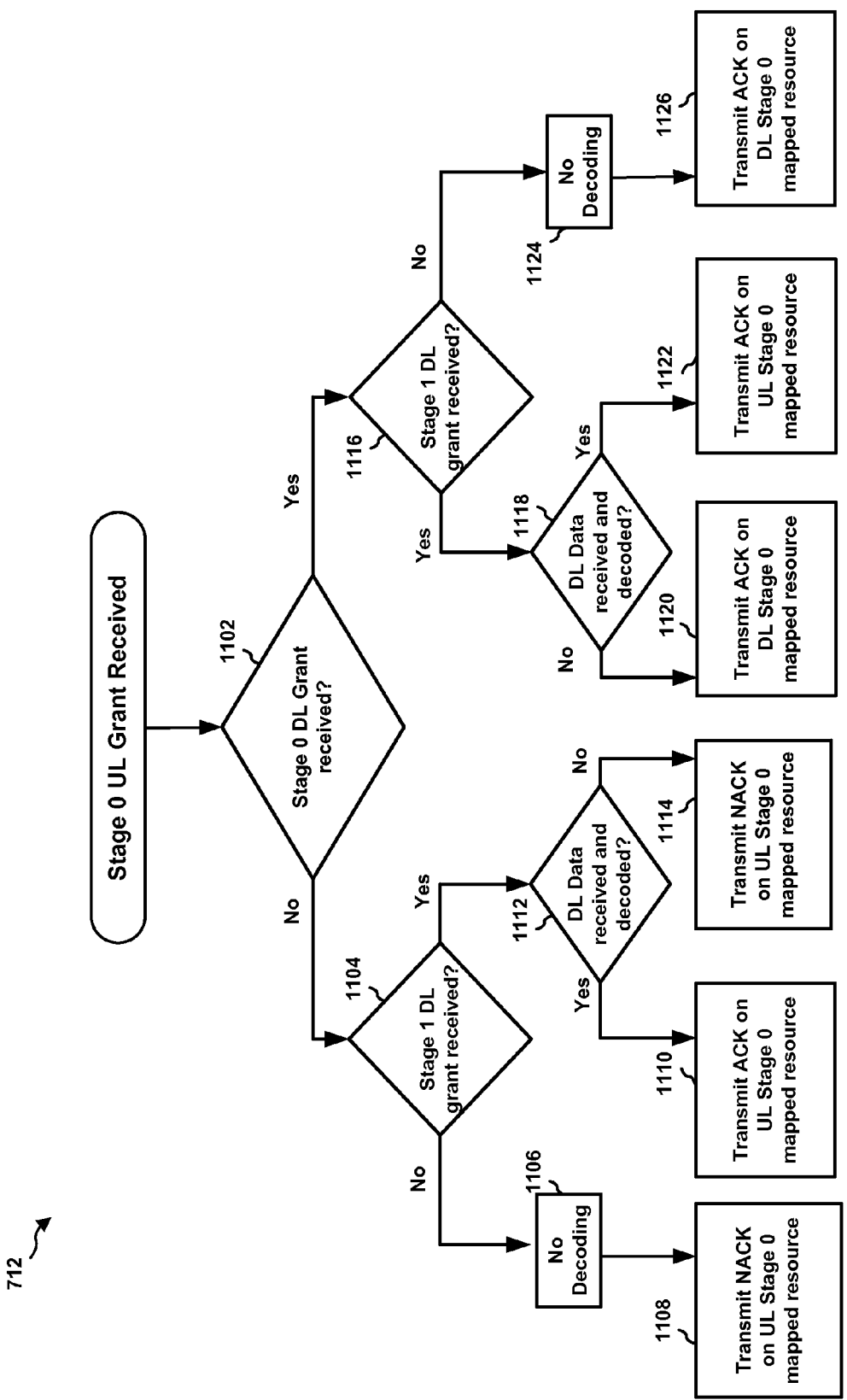
FIG. 11 is another diagram of an aspect of a rule flow in accordance with aspects of feedback signal management when the first stage uplink grant is received.

Referring to FIG. 11, one example of feedback rule 712 (or a portion of feedback rule 712) used in operation of an aspect of method 900 and an aspect of feedback manager component 106 includes a rule flow that defines aspects of feedback signal management in response to a determination that the first stage uplink grant (e.g., Stage 0 UL grant) is received. That is, UE 115-*a* and feedback manager component 106 may utilize this version of feedback rule 712 upon determining that the first stage uplink grant is received by UE 115-*a*.

At 1102, feedback manager component 106 according to feedback rule 712 may determine if UE 115-*a* received a first stage downlink grant from access point or network entity 105. If UE 115-*a* received a first stage downlink grant, the rule flow may continue to 1116; if UE 115-*a* did not receive a first stage downlink grant, the rule flow may continue to 1104.

At 1104 and 1116, feedback manager component 106 according to feedback rule 712 may determine if UE 115-*a* received a second stage downlink grant from access point or network entity 105. If UE 115-*a* received a second stage downlink grant, the rule flow may respectively continue to 1112 or 1118; if UE 115-*a* did not receive a second stage downlink grant, the rule flow may respectively continue to 1106 or 1124, which indicates that no decoding can occur due to a CRS failure, and thus the rule flow respectively proceeds to 1108 and 1126.

At 1108, feedback manager component 106 according to feedback rule 712 determines to transmit a NACK signal over resources granted by and mapped to the first stage uplink grant (e.g., Stage 0 UL grant), which indicates that the Stage 0 UL grant was received, the Stage 0 DL grant was not received, the Stage 1 DL grant was not received, and hence no decoding has occurred.

At 1126, feedback manager component 106 according to feedback rule 712 determines to transmit a NACK over resources granted by and mapped to the first stage downlink grant (e.g., Stage 0 DL Grant), which indicates that the Stage 0 UL grant was received, the Stage 0 DL grant was received, but that the Stage 1 DL grant was not received and hence no decoding has occurred.

At 1112 and 1118, feedback manager component 106 according to feedback rule 712 may determine if UE 115-*a* received downlink data and if the downlink data is successfully decoded by UE 115-*a*. If UE 115-*a* received downlink data and the downlink data is successfully decoded by UE 115-*a*, the rule flow may respectively continue to 1110 or 1122; if UE 115-*a* did not receive downlink data or UE 115-*a* received the downlink data but the downlink data is not successfully decoded by UE 115-*a*, the rule flow may respectively continue to 1114 or 1120.

At 1114, feedback manager component 106 according to feedback rule 712 may determine to transmit a NACK message over resources granted or mapped by the first stage uplink grant (e.g., Stage 0 UL grant), which indicates that the Stage 0 UL grant was received, the Stage 0 DL grant was not received, the Stage 1 DL grant was received but that decoding has not occurred (e.g., a CRC check failure).

At 1120, feedback manager component 106 according to feedback rule 712 may determine to transmit an ACK message over resources granted by and mapped to the first stage downlink grant (e.g., Stage 0 DL grant), which indicates that the Stage 0 UL grant was received, the Stage 0 DL grant was received, the Stage 1 DL grant was received but that decoding has not occurred (e.g., a CRC check failure).

At 1110 and 1122, feedback manager component 106 according to feedback rule 712 may determine to transmit an ACK message to a network over resources granted by and mapped to the first stage uplink grant (e.g., UL Stage 0 grant). As such, the ACK at 1110 indicates that the Stage 0 UL grant was received, the Stage 0 DL grant was not received, the Stage 1 DL grant was received and that the data was properly decoded (e.g., passed CRC check). Further, the ACK at 1122 indicates that the Stage 0 UL grant was received, the Stage 0 DL grant was received, the Stage 1 DL grant was received and that the data was properly decoded (e.g., passed CRC check).

Figure 12:
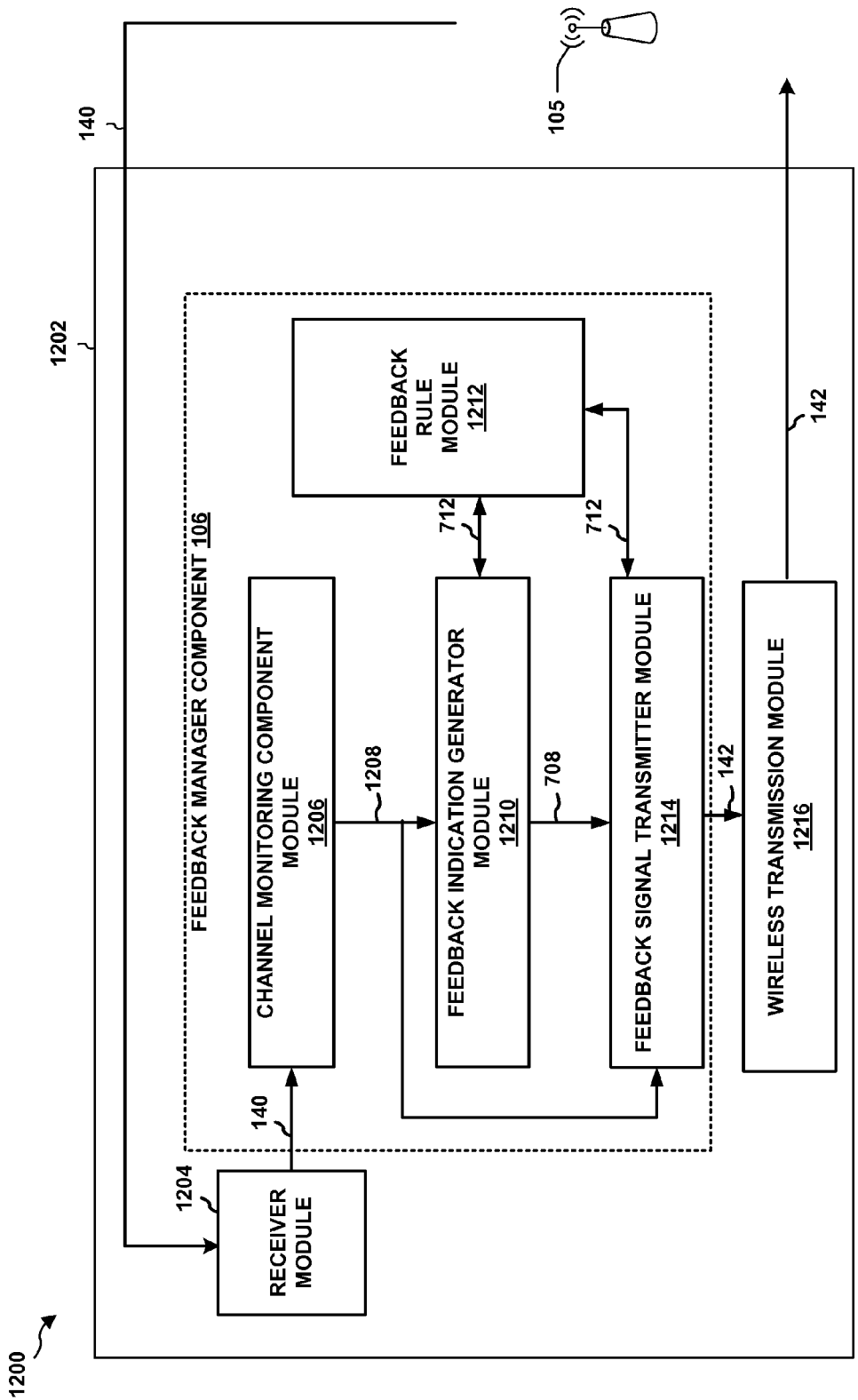
FIG. 12 is a conceptual data flow diagram illustrating the data flow between different modules/means/components in an exemplary apparatus in which feedback signal management may be implemented in accordance with the present aspects.

FIG. 12 is a conceptual data flow diagram 1200 illustrating the data flow between different modules/means/components in an exemplary apparatus 1202 that may implement UE 115-a and/or feedback manager component 106 as described herein. The apparatus 1202 includes a receiver module 1204 that is configured to receive signal 140 (e.g., sent to apparatus 1102 by an access point or network entity 105), one or more modules that define the functionality of feedback manager component 106, and a wireless transmission module 1216 that is configured to transmit feedback indication signal 142, for example, using a ULL data structure. In some aspects, receiver module 1204 and wireless transmission module 1216 may respectively refer to one or more components included in transceiver(s) 760 and/or RF front end 761 in FIG. 7.

In an aspect, receiving module 1104 may receive signal 140 having one or more channels and including one or more grants and downlink data from access point or network entity 105 and respectively signal 140 to channel monitoring component module 1206, which may implement channel monitoring component 702. Channel monitoring component module 1206 may then output other otherwise provide an indication of or provide access to the one or more grants and the downlink data 1208 to a feedback indication generator module 1210 and a feedback signal transmitter module 1214. Feedback indication generator module 1210 may implement feedback indication generator 704, while feedback signal transmitter module 1214 may implement feedback signal transmitter 714.

Further, feedback indication generator module 1210 and feedback signal transmitter module 1214 may be in communication with feedback rule module 1212 to receive or otherwise have access to one or more feedback rules 712. Accordingly, feedback indication generator module 1210 executes feedback rule 712 or a portion thereof with respect to the one or more received grants and/or the downlink data 1208 to output feedback indication 708. Correspondingly, feedback signal transmitter module 1214 executes feedback rule 712 or a portion thereof with respect to the one or more received grants and/or the downlink data 1208 and feedback indication 708 to output feedback indication signal 142 to a wireless transmission module 1216. Wireless transmission module 1216 transmits feedback indication signal 142 to access point or network entity 105.

The apparatus 1202 may include additional modules that perform each of the steps of the method and rule flow described in FIGS. 9-11. As such, each step in the aforementioned methods and rule flows may be performed by a module and the apparatus 1202 may include one or more of those modules. The modules may be one or more hardware components specifically configured to carry out the stated processes/algorithm, implemented by a processor configured to perform the stated processes/algorithm, stored within a computer readable medium for implementation by a processor, or some combination thereof.

Figure 13:
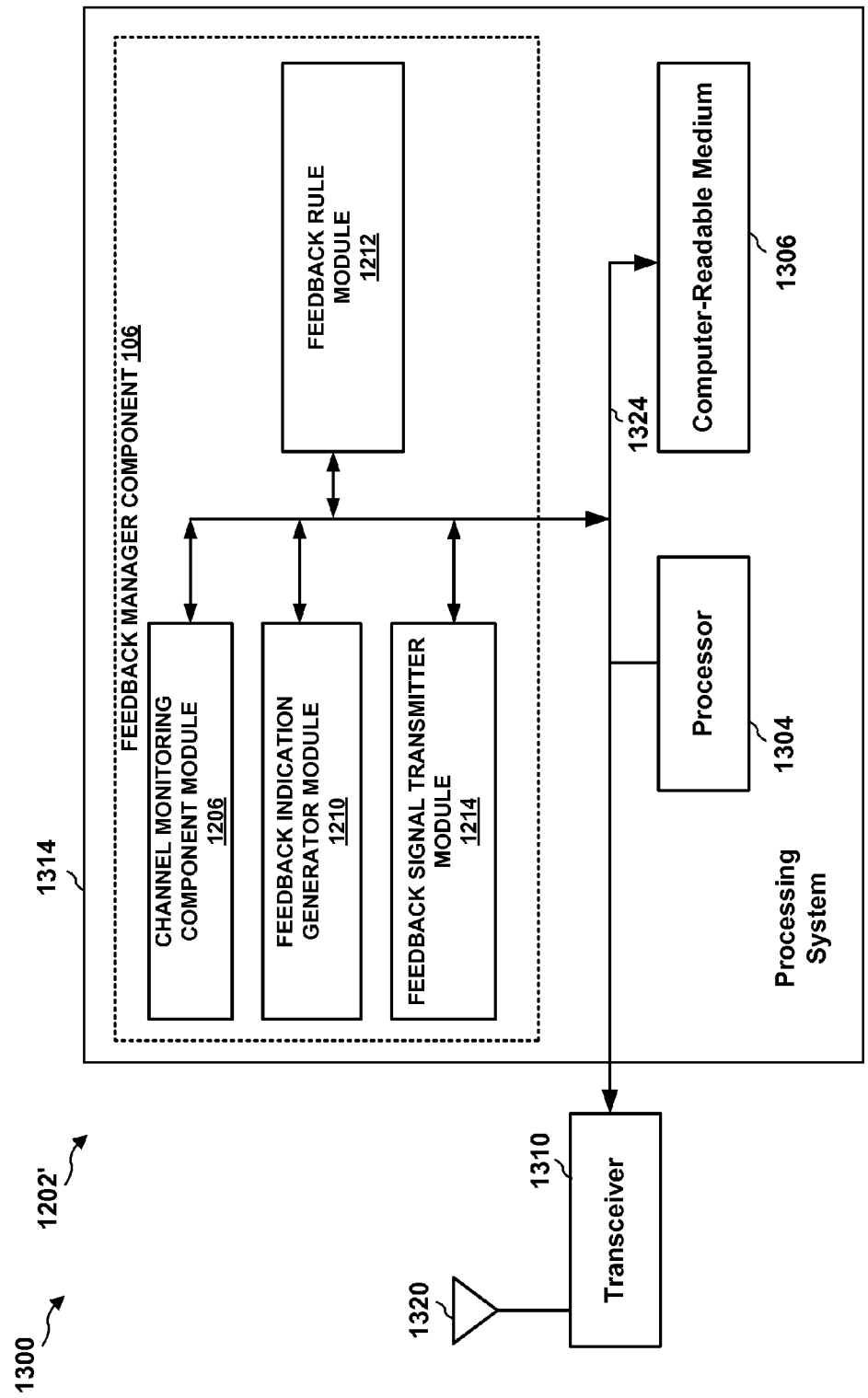
FIG. 13 is a diagram illustrating an example of a hardware implementation for an apparatus employing a processing system in which feedback signal management may be implemented in accordance with the present aspects.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, feedback manager component 106 and its components (including channel monitoring component module 1206, feedback indication generator module 1210, feedback rule module 1212, feedback signal transmitter module 1214, and the computer readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310, which may include receiver module 1204 and wireless transmission module 1216. The transceiver 1310 is coupled to one or more antennas 1320. The transceiver 1310 provides a means for communicating with various other apparatus over a transmission medium. In addition, the transceiver 1310 may be configured to transmit a ULL data structure and/or UE data for transmission to one or more UEs and may potentially include wireless transmission module 1216 of FIG. 12. The processing system 1314 includes a processor 1304 coupled to a computer readable medium 1306. The processor 1304 is responsible for general processing, including the execution of software stored on the computer readable medium 1306. The software, when executed by the processor 1304, causes the processing system 1314 to perform the various functions described supra for any particular apparatus. The computer readable medium 1306 may also be used for storing data that is manipulated by the processor 1304 when executing software. The processing system further includes at least the respective modules of feedback manager component 106. The modules/components may be software modules running in the processor 1304, resident/stored in the computer readable medium 1306, one or more hardware modules coupled to the processor 1304, or some combination thereof. The processing system 1314 may be a component of a UE, such as UE 115-a or such as UE 650 and may include the memory 660 and/or at least one of the TX processor 668, the RX processor 656, and the controller/processor 659, any combination of which may implement feedback manager component 106. In some aspects, transceiver 1310 may refer to one or more components included in transceiver(s) 760 and/or RF front end 761 in FIG. 7; processor 1304 may refer to processor 750 in FIG. 7; and computer readable medium 1306 may refer to memory 744 in FIG. 7.

In one configuration, the apparatus 1202/1202' for wireless communication includes means for monitoring for signals from a network entity on one or more channels, means for determining, based on the monitoring, whether one or more grants are received and whether UE data is received on the one or more channels, means for generating a feedback indication having a feedback value determined according to a feedback rule and based on whether the one or more grants and the UE data are received, and means for transmitting the feedback indication to the network on a resource determined according to the feedback rule and based on whether the one or more grants and the UE data are received. The aforementioned means may be one or more of the aforementioned modules of the apparatus 1202 and/or the processing system 1314 of the apparatus 1202' configured to perform the functions recited by the aforementioned means. As described supra, the processing system 1314 may include at least one of the TX processor 668, the RX processor 656, and the controller/processor 659. As such, in one configuration, the aforementioned means may be at least one of the TX processor 668, the RX processor 656, and the controller/processor 659 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a UE, which can be a wired terminal or a wireless terminal. A UE can also be called a system, device, subscriber unit, subscriber station, mobile station, mobile, mobile device, remote station, remote terminal, access terminal, user terminal, terminal, communication device, user agent, or user device. A UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with UE or wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as LTE, CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer readable medium. Computer readable media includes both computer storage media and communication media including any medium that facilitates transfer of a computer program from one place to another. A storage medium may be any available media that can be accessed by a computer. By way of example, and not limitation, such computer readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of providing feedback with respect to downlink communications received by a user equipment (UE), comprising:
    monitoring for signals from a network entity on one or more channels;
    determining, based on the monitoring, whether one or more grants are received and whether UE data is received on the one or more channels; wherein the determining comprises:
        determining whether the UE received a first stage uplink grant from the network entity;
        determining a first condition based on whether the UE received a first stage downlink grant from the network entity;
        determining a second condition based on whether the UE received a second stage downlink grant from the network entity; and
        determining a third condition based on whether the UE received the UE data and whether the UE data is successfully decoded by the UE;
    generating a feedback indication having a feedback value determined according to a feedback rule and based on whether the one or more grants and the UE data are received; and
    transmitting the feedback indication to the network entity on a resource determined according to the feedback rule and based on whether the one or more grants and the UE data are received.

2. The method of claim 1, wherein a determination that the UE did not receive the first stage uplink grant from the network entity, and wherein the feedback indication includes a discontinuous transmission (DTX) signal correspond to:
    the first condition indicating that the first stage downlink grant was not received; and
    the second condition indicating that the second stage downlink grant was not received.

3. The method of claim 1, wherein a determination that the UE did not receive the first stage uplink grant from the network entity, and wherein the feedback indication includes an acknowledgement (ACK) message for transmission over resources granted by the second stage downlink grant correspond to:
    the first condition indicating that the first stage downlink grant was not received;
    the second condition indicating that the second stage downlink grant was received; and
    the third condition indicating that downlink data was successfully decoded.

4. The method of claim 1, wherein a determination that the UE did not receive the first stage uplink grant from the network entity, and wherein the feedback indication includes a discontinuous transmission (DTX) signal correspond to:
    the first condition indicating that the first stage downlink grant was not received;
    the second condition indicating that the second stage downlink grant was received; and
    the third condition indicating that downlink data was not successfully decoded.

5. The method of claim 1, wherein a determination that the UE did not receive the first stage uplink grant from the network entity, and wherein the feedback indication includes a negative acknowledgement (NACK) message for transmission over resources granted by the first stage downlink grant correspond to:
    the first condition indicating that the first stage downlink grant was received;
    the second condition indicating that the second stage downlink grant was not received; and
    the third condition indicating that downlink data was not received.

6. The method of claim 1, wherein a determination that the UE did not receive the first stage uplink grant from the network entity, and wherein the feedback indication includes an acknowledgement (ACK) message for transmission over resources granted by the second stage downlink grant correspond to:
    the first condition indicating that the first stage downlink grant was received;
    the second condition indicating that the second stage downlink grant was received; and
    the third condition indicating that downlink data was successfully decoded.

7. The method of claim 1, wherein a determination that the UE did not receive the first stage uplink grant from the network entity, and wherein the feedback indication includes a negative acknowledgement (NACK) message for transmission over resources granted by the first stage downlink grant correspond to:
    the first condition indicating that the first stage downlink grant was received;
    the second condition indicating that the second stage downlink grant was received; and
    the third condition indicating that downlink data was not successfully decoded.

8. The method of claim 1, wherein a determination that the UE received the first stage uplink grant, and wherein the feedback indication includes a NACK message for transmission over resources granted by the first stage uplink grant correspond to:
the first condition indicating that the first stage downlink grant was not received; and
the second condition indicating that the second stage downlink grant was not received.

9. The method of claim 1, wherein a determination that the UE received the first stage uplink grant, and wherein the feedback indication includes an ACK message for transmission over resources granted by the first stage uplink grant correspond to:
the first condition indicating that the first stage downlink grant was not received;
the second condition indicating that the second stage downlink grant was received; and
the third condition indicating that downlink data was successfully decoded.

10. The method of claim 1, wherein a determination that the UE received the first stage uplink grant, and wherein the feedback indication includes a NACK message for transmission over resources granted by the first stage uplink grant correspond to:
the first condition indicating that the first stage downlink grant was not received;
the second condition indicating that the second stage downlink grant was received; and
the third condition indicating that downlink data was not successfully decoded.

11. The method of claim 1, wherein a determination that the UE received the first stage uplink grant, and wherein the feedback indication includes an ACK message for transmission over resources granted by the first stage downlink grant correspond to:
the first condition indicating that the first stage downlink grant was received by the UE; and
the second condition indicating that the second stage downlink grant was not received.

12. The method of claim 1, wherein a determination that the UE received the first stage uplink grant, and wherein the feedback indication includes an ACK message for transmission over resources granted by the first stage uplink grant correspond to:
the first condition indicating that the first stage downlink grant was received;
the second condition indicating that the second stage downlink grant was received; and
the third condition indicating that downlink data was successfully decoded.

13. The method of claim 1, wherein a determination that the UE received the first stage uplink grant, and wherein the feedback indication includes an ACK message for transmission over resources granted by the first stage downlink grant correspond to:
the first condition indicating that the first stage downlink grant was received;
the second condition indicating that the second stage downlink grant was received; and
the third condition indicating that downlink data was not successfully decoded.

14. The method of claim 1, wherein the first stage downlink grant assigns at least one of a modulation coding scheme (MCS) parameter, a precoding parameter, or a power control parameter to the UE.

15. The method of claim 1, wherein the second stage downlink grant assigns bandwidth resources to the UE.

16. The method of claim 1, further comprising:
performing at least one of the monitoring for signals or the transmitting the feedback indication to the network entity in a transmission time interval (TTI) less than one subframe.

17. A non-transitory computer readable medium storing computer executable code for providing feedback with respect to downlink communications received by a user equipment (UE), comprising:
code for monitoring for signals from a network entity on one or more channels;
code for determining, based on the monitoring, whether one or more grants are received and whether UE data is received on the one or more channels; wherein the code for determining comprises:
code for determining whether the UE received a first stage uplink grant from the network entity;
code for determining a first condition based on whether the UE received a first stage downlink grant from the network entity;
code for determining a second condition based on whether the UE received a second stage downlink grant from the network entity; and
code for determining a third condition based on whether the UE received the UE data and whether the UE data is successfully decoded by the UE;
code for generating a feedback indication having a feedback value determined according to a feedback rule and based on whether the one or more grants and the UE data are received; and
code for transmitting the feedback indication to the network entity on a resource determined according to the feedback rule and based on whether the one or more grants and the UE data are received.

18. An apparatus for providing feedback with respect to downlink communications received by a user equipment (UE), comprising:
means for monitoring for signals from a network entity on one or more channels;
means for determining, based on the monitoring, whether one or more grants are received and whether UE data is received on the one or more channels; wherein the means for determining comprises:
means for determining whether the UE received a first stage uplink grant from the network entity;
means for determining a first condition based on whether the UE received a first stage downlink grant from the network entity;
means for determining a second condition based on whether the UE received a second stage downlink grant from the network entity; and
means for determining a third condition based on whether the UE received the UE data and whether the UE data is successfully decoded by the UE;
means for generating a feedback indication having a feedback value determined according to a feedback rule and based on whether the one or more grants and the UE data are received; and
means for transmitting the feedback indication to the network entity on a resource determined according to the feedback rule and based on whether the one or more grants and the UE data are received.

19. An apparatus for providing feedback with respect to downlink communications received by a user equipment (UE), comprising:

a transceiver configured to receive signals from a network entity on one or more channels;
a processor in communication with the transceiver, wherein the processor is configured to execute instructions to:
monitor for the signals from the network entity on the one or more channels;
determine, based on the monitoring, whether one or more grants are received and whether UE data is received on the one or more channels; wherein the instructions to determine comprise instructions to:
determine whether the UE received a first stage uplink grant from the network entity;
determine a first condition based on whether the UE received a first stage downlink grant from the network entity;
determine a second condition based on whether the UE received a second stage downlink grant from the network entity; and
determine a third condition based on whether the UE received the UE data and whether the UE data is successfully decoded by the UE;
generate a feedback indication having a feedback value determined according to a feedback rule and based on whether the one or more grants and the UE data are received; and
transmit, via the transceiver, the feedback indication to the network entity on a resource determined according to the feedback rule and based on whether the one or more grants and the UE data are received; and
a memory communicatively coupled with the processor to store the executable instructions and at least one of the feedback indication or the feedback value.

20. The apparatus of claim 19, wherein a determination that the UE did not receive the first stage uplink grant from the network entity, and wherein the feedback indication includes a discontinuous transmission (DTX) signal correspond to:
the first condition indicating that the first stage downlink grant was not received; and
the second condition indicating that the second stage downlink grant was not received.

21. The apparatus of claim 19, wherein a determination the UE did not receive the first stage uplink grant from the network entity, and wherein the feedback indication includes an acknowledgement (ACK) message for transmission over resources granted by the second stage downlink grant correspond to:
the first condition indicating that the first stage downlink grant was not received;
the second condition indicating that the second stage downlink grant was received; and
the third condition indicating that downlink data was successfully decoded.

22. The apparatus of claim 19, wherein a determination that the UE did not receive the first stage uplink grant from the network entity, and wherein the feedback indication includes a discontinuous transmission (DTX) signal correspond to:
the first condition indicating that the first stage downlink grant was not received;
the second condition indicating that the second stage downlink grant was received; and
the third condition indicating that downlink data was not successfully decoded.

23. The apparatus of claim 19, wherein a determination that the UE did not receive the first stage uplink grant from the network entity, and wherein the feedback indication includes a negative acknowledgement (NACK) message for transmission over resources granted by the first stage downlink grant correspond to:
the first condition indicating that the first stage downlink grant was received;
the second condition indicating that the second stage downlink grant was not received; and
the third condition indicating that downlink data was not received.

24. The apparatus of claim 19, wherein a determination that the UE did not receive the first stage uplink grant from the network entity, and wherein the feedback indication includes an acknowledgement (ACK) message for transmission over resources granted by the second stage downlink grant correspond to:
the first condition indicating that the first stage downlink grant was received;
the second condition indicating that the second stage downlink grant was received; and
the third condition indicating that downlink data was successfully decoded.

25. The apparatus of claim 19, wherein a determination that the UE did not receive the first stage uplink grant from the network entity, and wherein the feedback indication includes a negative acknowledgement (NACK) message for transmission over resources granted by the first stage downlink grant correspond to:
the first condition indicating that the first stage downlink grant was received;
the second condition indicating that the second stage downlink grant was received; and
the third condition indicating that downlink data was not successfully decoded.

26. The apparatus of claim 19, wherein a determination that the UE received the first stage uplink grant, and wherein the feedback indication includes a NACK message for transmission over resources granted by the first stage uplink grant correspond to:
the first condition indicating that the first stage downlink grant was not received; and
the second condition indicating that the second stage downlink grant was not received.

* * * * *